No. 773,322. PATENTED OCT. 25, 1904.
C. W. HINMAN.
CARBURETER.
APPLICATION FILED FEB. 12, 1903.
NO MODEL. 2 SHEETS—SHEET 1.

Witnesses:
H. B. Davis
Maud M. Piper

Inventor:
Chas. W. Hinman
by Noyes & Hinman
attys

No. 773,322. PATENTED OCT. 25, 1904.
C. W. HINMAN.
CARBURETER.
APPLICATION FILED FEB. 12, 1903.
NO MODEL. 2 SHEETS—SHEET 2.
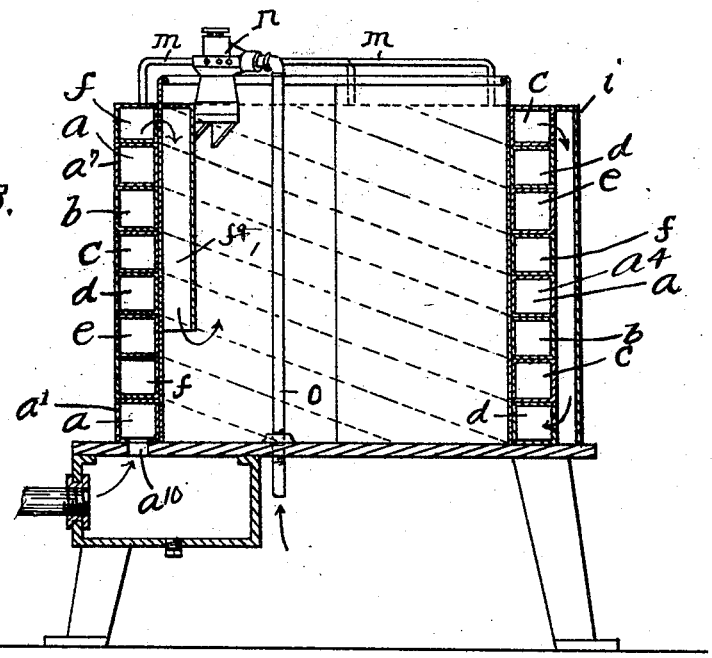
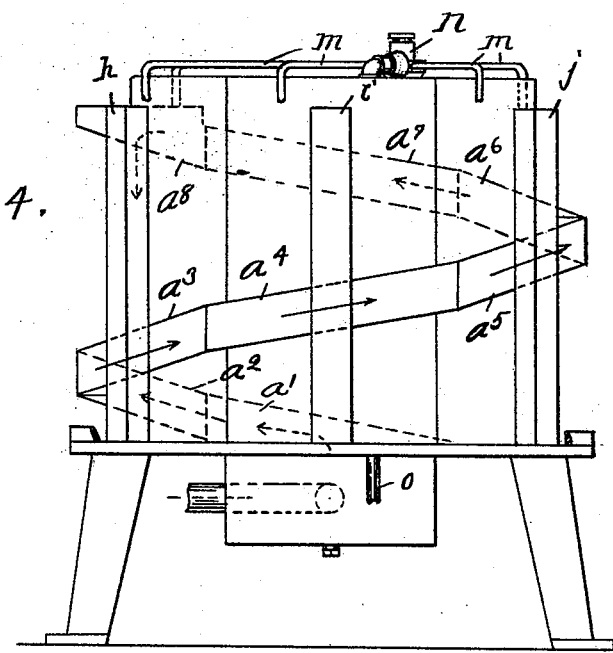
Witnesses:
H. B. Davis.
Maud M. Piper.
Inventor:
Chas. W. Hinman
by Noyes & Hinman
Attys No. 773,322. Patented October 25, 1904.

UNITED STATES PATENT OFFICE.

CHARLES W. HINMAN, OF BOSTON, MASSACHUSETTS.

CARBURETER.

SPECIFICATION forming part of Letters Patent No. 773,322, dated October 25, 1904.

Application filed February 12, 1903. Serial No. 143,020. (No model.)

*To all whom it may concern:*

Be it known that I, CHARLES W. HINMAN, of Boston, county of Suffolk, State of Massachusetts, have invented an Improvement in Carbureters, of which the following description, in connection with the accompanying drawings, is a specification, like characters on the drawings representing like parts.

This invention relates to carbureters, and has for its object to improve the construction of the same to the end that a long passage-way is provided, arranged in very compact form, having an inlet for the air and an outlet for the mixed air and gas, and also to the end that the liquid hydrocarbon will be delivered to said passage-way in minute quantities at intervals along its length.

Figure 1:
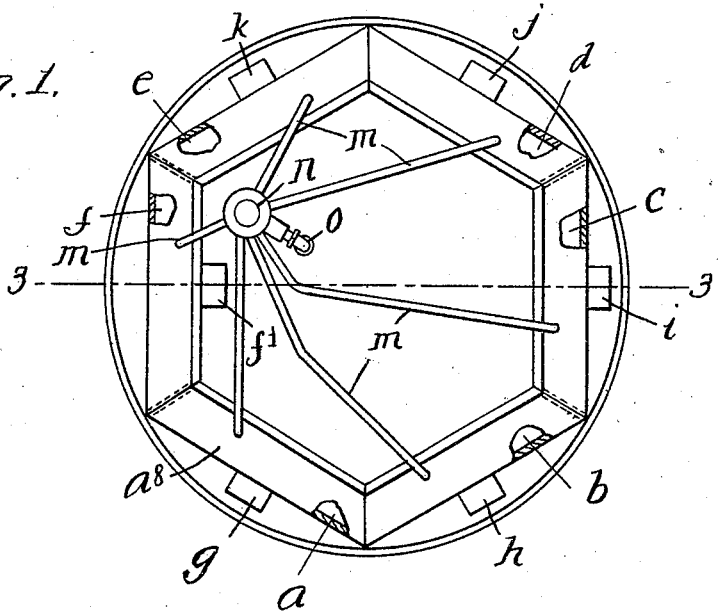
Figure 2:
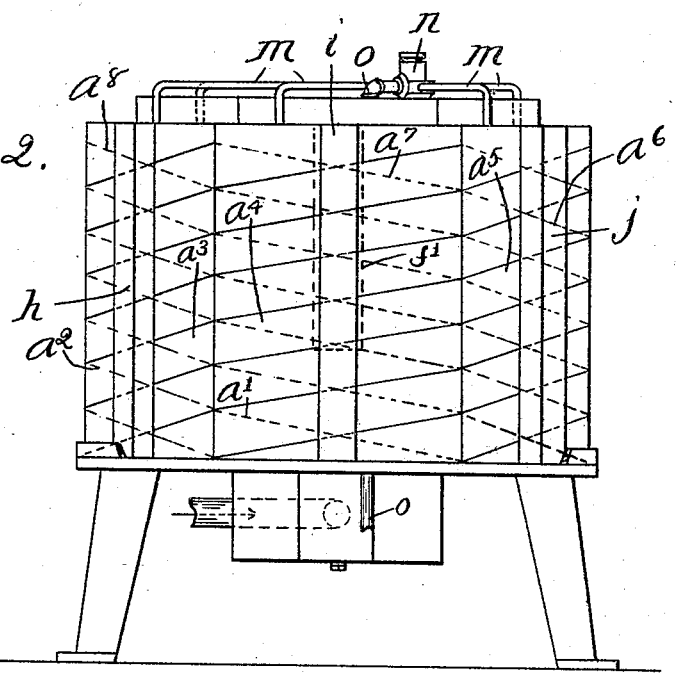

Figure 1 shows in plan view a carbureter embodying this invention. Fig. 2 is a side elevation of the carbureter shown in Fig. 1. Fig. 3 is a vertical section of the carbureter shown in Fig. 1, taken on the dotted line 3 3. Fig. 4 is a side elevation of a portion of the carbureter shown in Fig. 1, in said figure all of the spiral passage-ways being omitted except one.

$a\ b\ c\ d\ e\ f$ represent six spiral passage-ways, yet any other number may be employed, if desired. These passage-ways are made quadrangular in cross-section in order that they may be made of short flat strips of sheet metal soldered together, and they are superimposed to insure compactness as well as cheapness in manufacture. Each spiral passage-way is herein shown as hexagonal, although it need not be thus formed, and comprises eight inclined communicating sections secured together, although any other number may be employed. In Fig. 4 one of the spiral passage-ways is shown, and $a'\ a^2\ a^3\ a^4\ a^5\ a^6\ a^7\ a^8$ represent the several inclined sections thereof. Each section is composed of two parallel side walls, a top wall, and a bottom wall, although in the manufacture of the carbureter the top wall of each section forms the bottom wall of the section above it. When each spiral passage-way comprises eight inclined sections, as herein shown, said spiral passage-way makes one complete turn and one-third of the next turn. The lower end of one of the spiral passage-ways, as $a$, for instance, has an inlet $a^{10}$ for the admission of air, this being the only inlet to the completed passage-way, and the air is admitted at this inlet. Another one of the spiral passage-ways, as $f$, for instance, has an outlet $f'$, which is the outlet for the mixed air and gas, and this is the only outlet from the completed passage-way. The outlet passage-way $f'$ is made as a vertical pipe located on the inside of the several spiral passage-ways. The several spiral passage-ways are connected together, so as to produce one continuous unobstructed passage-way, and to accomplish this result several vertical passage-ways $g\ h\ i\ j\ k$ are provided which are composed of flat strips of sheet metal soldered together to form a quadrangular passage-way, and they are located outside of the stack of the spiral passage-ways, and each has an opening at the top communicating with the upper end of one of the spiral passage-ways and an opening at the bottom communicating with the lower end of the next spiral passage-way, so that the air passing up through one of the spiral passage-ways enters the top of one of the upright passage-ways and passes down said passage-way and enters the lower end of the next spiral passage-way, and so on through the entire series.

A minute quantity of liquid hydrocarbon is supplied to the top of each spiral passage-way, which passes down by gravity, and to thus deliver the liquid hydrocarbon to the several spiral passage-ways a pipe, as $m$, leads from a pipe-union $n$ to the top of each spiral passage-way, as represented in Fig. 3, thus distributing the liquid hydrocarbon to each spiral passage-way. A supply-pipe $o$ for the liquid hydrocarbon is connected to the pipe-union $n$. The air which enters the inlet $a^{10}$ first enters a box-like compartment located beneath said inlet, and said compartment serves as a receptacle for any unvolatilized hydrocarbon, and said compartment has a hole at the bottom which is closed by a screw-plug the removal of which permits the unvolatilized hydrocarbon to be drawn off. The carbureted air which is delivered from the pipe

*f'* passes into any usual bell (not shown) which incloses the carbureter and thence to a delivery-pipe in the usual manner.

Having thus described my invention, what I claim as new, and desire to secure by Letters Patent, is—

1. A carbureter having a plurality of spiral passage-ways, the upper and lower ends of which are connected together, to produce a single unobstructed passage-way having an inlet and an outlet, an air-pipe connected thereto at the inlet, a pipe connected to each spiral passage-way which conducts liquid hydrocarbon thereto, a distributing-chamber through which said pipes lead, and a supply-pipe leading to said chamber, substantially as described.

2. A carbureter having a plurality of superimposed spiral passage-ways, the upper and lower ends of which are connected together to produce a single unobstructed passage-way having an inlet and an outlet, an air-pipe connected thereto at the inlet, a pipe connected to each spiral passage-way which conducts liquid hydrocarbon thereto, a distributing-chamber from which said plurality of pipes lead, and a supply-pipe leading to said chamber, substantially as described.

In testimony whereof I have signed my name to this specification in the presence of two subscribing witnesses.

CHARLES W. HINMAN.

Witnesses:
 LOUIS H. HARRIMAN,
 M. M. PIPER.